(12) United States Patent (10) Patent No.: US 8,469,815 B2
Hovseth (45) Date of Patent: Jun. 25, 2013

(54) VIDEO GAME ACCESSORY

(75) Inventor: Lawrence D. Hovseth, Circle Pines, MN (US)

(73) Assignee: Imation Corp., St. Paul, MN (US)

( * ) Notice: Subject to any disclaimer, the term of this patent is extended or adjusted under 35 U.S.C. 154(b) by 386 days.

(21) Appl. No.: 12/853,813

(22) Filed: Aug. 10, 2010

(65) Prior Publication Data

US 2012/0040758 A1 Feb. 16, 2012

(51) Int. Cl.
*A63F 13/02* (2006.01)
*A63F 13/06* (2006.01)

(52) U.S. Cl.
USPC .................... 463/38; 463/36; 463/37; 463/39

(58) Field of Classification Search
USPC .............................................. 463/36–38, 39
See application file for complete search history.

(56) References Cited

U.S. PATENT DOCUMENTS

2009/0282878 A1* 11/2009 D'Angelo ........................ 70/209
2010/0009762 A1* 1/2010 Takeda et al. .................. 463/47
2011/0275437 A1* 11/2011 Jennings et al. ............... 463/38

OTHER PUBLICATIONS

DIYTrade Website "for Wii steering wheel with motion plus," http://www.diytrade.com/china/4/products/6963490/for_Wii_steering_wheel_with_motion_plus.html, accessed Jun. 29, 2010, last modified Jun. 19, 2010, 3 pp.
DIYTrade Website "FS19209 Wii Racing Multi-Axis System (Motion Plus)," http://www.diytrade.com/china/4/products/6819788/FS19209_Wii_Racing_Multi-Axis_System_Motion_Plus.html, accessed Jun. 29, 2010, last modified May 15, 2010, 3 pp.
DIYTrade Website "GT Pro Wheel for Wii (support motion plus)," http://www.diytrade.com/china/4/products/5560785/GT_Pro_Wheel_for_Wii_support_motion_plus.html, accessed Jun. 29, 2010, last modified Jun. 22, 2010. 3 pp.
DIYTrade Website "Steering Wheel for Wii Motion Plus," www.diytrade.com/china/4/products/5789152/Steering_Wheel_for_Wii_Motion_Plus.html, accessed Jun. 29, 2010, last modified Oct. 6, 2009, 3 pp.
DIYTrade Website "Steering wheel with motion plus for Wii," http://www.diytrade.com/china/4/products/5789152/Steering_Wheel_for_Wii_Motion_Plus.html, accessed Jun. 29, 2010, last modified Jan. 11, 2010, 2 pp.
Shenzhen Swei Electronics Co., Ltd. Website "New model Wii Mario Steering Wheel(motion plus)," accessed Jun. 30, 2010, Oct. 21, 2009, www.swei.cn/main/p_show.php/p_show_bak/2511, 1 p.
DIYTrade Website "Wii motion Plus racing wheel," www.diytrade.com/china/4/products/5787949/Wii_motion_Plus_racing_wheel.html, accessed Jun. 29, 2010, last modified Sep. 7, 2009, 3 pp.
DIYTrade Website "Wii Motion Plus Steering Wheel, Wii accessories," www.diytrade.com/china/4/products/6486255/Wii_Motion_Plus_Steering_Wheel_Wii_accessories.html, accessed Jun. 29, 2010, last modified May 13, 2010, 3 pp.
DIYTrade Website "Wii Motion Plus Wheel," www.diytrade.com/china/4/products/3901321/WII_Motion_Plus_Wheel.html, accessed Jun. 29, 2010, last modified Nov. 7, 2009, 4 pp.
DIYTrade Website "Wii steering wheel for motion plus," http://www.diytrade.com/china/4/products/5696077/WII_steering_wheel_for_motion_plus.html, accessed Jun. 29, 2010, last modified Mar. 12, 2010, 3 pp.

* cited by examiner

*Primary Examiner* — Damon Pierce
(74) *Attorney, Agent, or Firm* — Winthrop & Weinstine, P.A.

(57) ABSTRACT

A video game accessory comprises a body configured to receive a video game controller at a first location of the body, receive a controller expansion device connectable to the video game controller at a second location of the body, and maintain the orientation of the controller expansion device so that the orientation of the controller expansion device is substantially fixed with respect to an orientation of the video game controller, and a pass through cable comprising a first end that includes a first connector and a second end that includes a second connector, the pass through cable extending from the first location to the second location, wherein the first connector is engageable with a first mating connector of the video game controller and the second connector is engageable with a second mating connector of the controller expansion device.

18 Claims, 10 Drawing Sheets

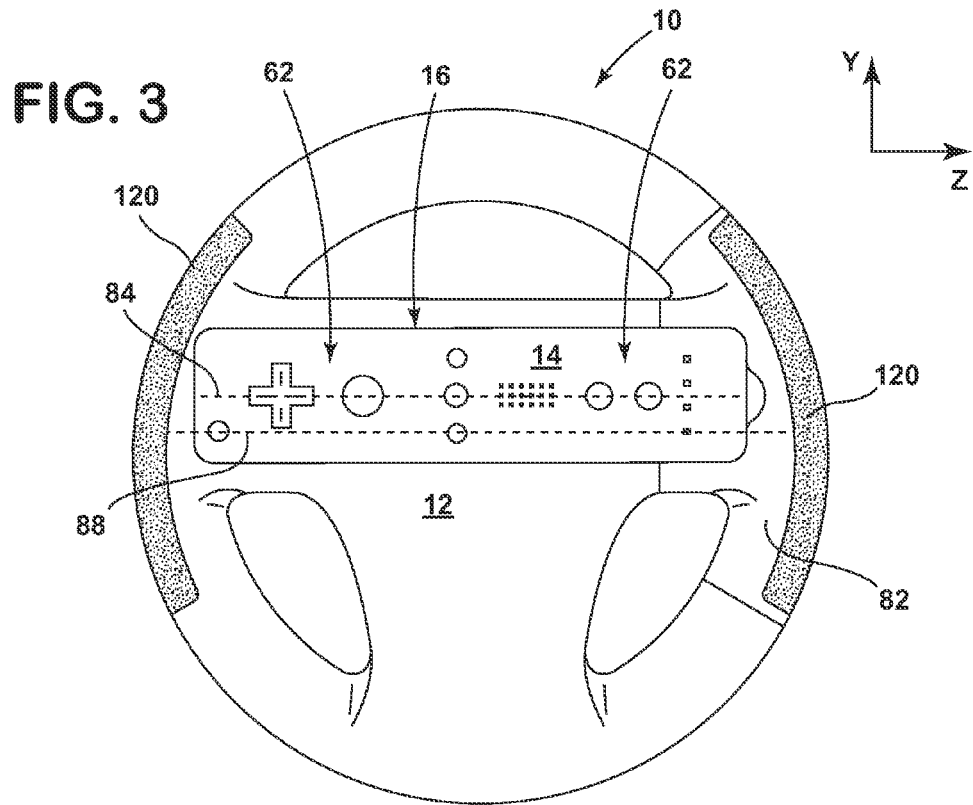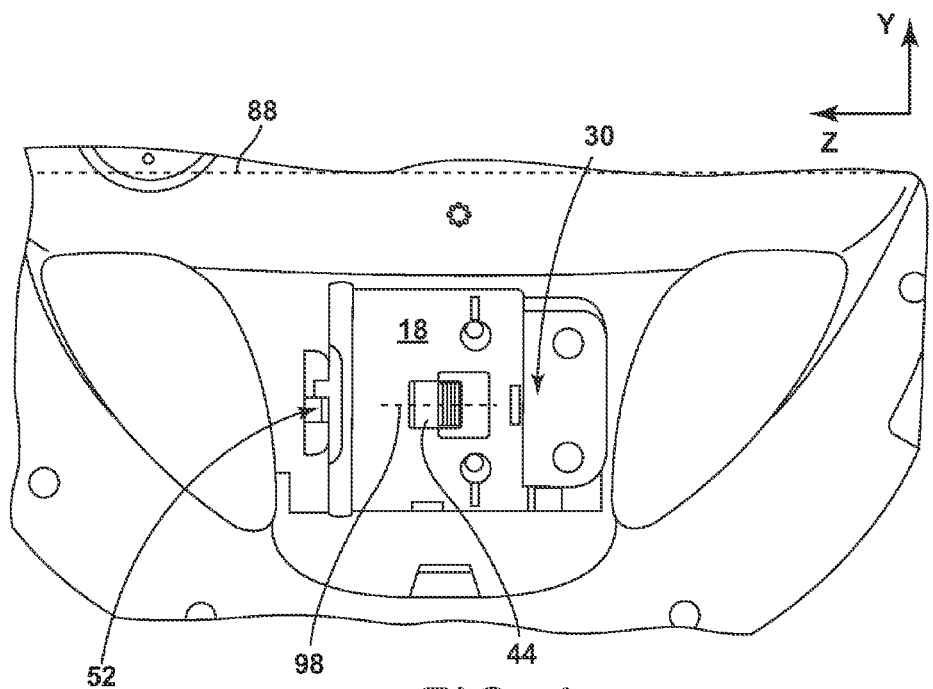

VIDEO GAME ACCESSORY

TECHNICAL FIELD

The invention relates to accessories for video game systems.

BACKGROUND

Motion sensing home video game systems have become one of the more popular types of video game systems. The Nintendo Wii is one of the first and most well-known versions of a motion-sensing system. The Wii uses a wireless motion-sensing video game controller, referred to as a Wii Remote, which includes a two-axis accelerometer to detect pitch and yaw orientation, and acceleration of the Wii Remote. Nintendo has also developed the Wii MotionPlus expansion device, which is used in conjunction with the Wii Remote to detect roll. The Wii MotionPlus device uses a tuning fork gyroscope to provide for more accurate motion sensing compared to the Wii Remote alone.

For some video games, the dimensions of the video game controller may limit the realism that is experienced during game play. For example, the Wii Remote is generally rectangular shaped and measures only about 150 mm (about 6 inches) long and about 36 mm (about 1.4 inches) wide, so that certain types of games, for example driving games, may not feel realistic using the Wii Remote alone. For these game types, it may be desirable to provide an accessory that interacts with the video game controller to enhance realism of the gaming experience. For example, for driving games, an accessory resembling a steering wheel may be provided that receives the video game controller to enhance the user's experience.

SUMMARY

In general, the invention is directed to a video game accessory that receives a video game controller at a first location of a body and a controller expansion device at a second location of the body and maintains the orientation of the controller expansion device with respect to the orientation of the video game controller.

In one aspect, the disclosure is directed to a video game accessory comprising a body configured to receive a video game controller at a first location of the body, receive a controller expansion device connectable to the video game controller at a second location of the body, and maintain the orientation of the controller expansion device so that the orientation of the controller expansion device is substantially fixed with respect to an orientation of the video game controller, and a pass through cable comprising a first end that includes a first connector and a second end that includes a second connector, the pass through cable extending from the first location to the second location, wherein the first connector is engageable with a first mating connector of the video game controller and the second connector is engageable with a second mating connector of the controller expansion device.

In another aspect, the disclosure is directed to a video game accessory comprising a steering wheel comprising a first compartment proportioned to receive a video game controller and a second compartment proportioned to receive a controller expansion device connectable to the video game controller, and a pass through cable comprising a first end that includes a first connector and a second end that includes a second connector, the pass through cable extending from the first compartment to the second compartment, wherein the first connector is engageable with a first mating connector of the video game controller and the second connector is engageable with a second mating connector of the controller expansion device, wherein the first compartment is configured secure the video game controller in an orientation that is substantially fixed with respect to the orientation of the steering wheel and wherein the second compartment is configured to secure the controller expansion device in an orientation that is substantially fixed with respect to the orientation of the steering wheel so that the orientation of the controller expansion device is substantially fixed with respect to the orientation of the video game controller.

In another aspect, the invention is directed to a video game accessory comprising a steering wheel comprising a first compartment that receives a video game controller and a second compartment that receives a controller expansion device connectable to the video game controller, a slider at the first compartment, wherein the slider is movable from an open position to a closed position, wherein the video game controller is receivable in the first compartment when the slider is in the open position and wherein the video game controller is held within the first compartment such that the orientation of the video game controller is substantially fixed with respect to the orientation of the steering wheel, a pass through cable comprising a first end that includes a first connector and a second end that includes a second connector, the pass through cable extending from the first compartment to the second compartment through an interior portion of the steering wheel, wherein the first connector is secured to the slider so that the first connector is engageable with the video game controller when the slider is in the closed position, and wherein the second connector is secured to the body at the second location, wherein the first connector is engageable with a first mating connector of the video game controller and the second connector is engageable with a second mating connector of the controller expansion device, and a cover for covering at least a portion of the second compartment, wherein the controller expansion device has an orientation that is substantially fixed with respect to the orientation of the steering wheel so that the orientation of the controller expansion device is substantially fixed with respect to the orientation of the video game controller when the second mating connector of the controller expansion device is mated with the second connector and when the cover covers the portion of the second compartment.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 3 is a front view of the example video game accessory with a video game controller installed in an example controller compartment.

FIG. 4 is a back view of the example video game accessory with a controller expansion device installed in an example expansion device compartment.

DETAILED DESCRIPTION

In general, this disclosure is directed to a video game accessory that may be used with a video game controller and a controller expansion device for a video game system. In one example, the video game accessory comprises a body that receives the video game controller and the controller expansion device and electrically couples the controller and the accessory with a pass through cable. The video game accessory with the pass through cable allows the video game controller and controller expansion device to be placed separate from one another when associated with the video game accessory, which in turn allows for desirable placement of the video game controller within the video game accessory to allow for easy access and manipulation of controls (e.g., buttons, directional pads, and/or joysticks used to control action within a video game) of the video game controller by the video game user (also referred to herein as "video game player," "player," or "gamer"). The video game accessory also allows for controlled placement of both the video game controller and the controller expansion device to provide for a particular balance and weight distribution in order to achieve a desired effect for the player.

Figure 1:
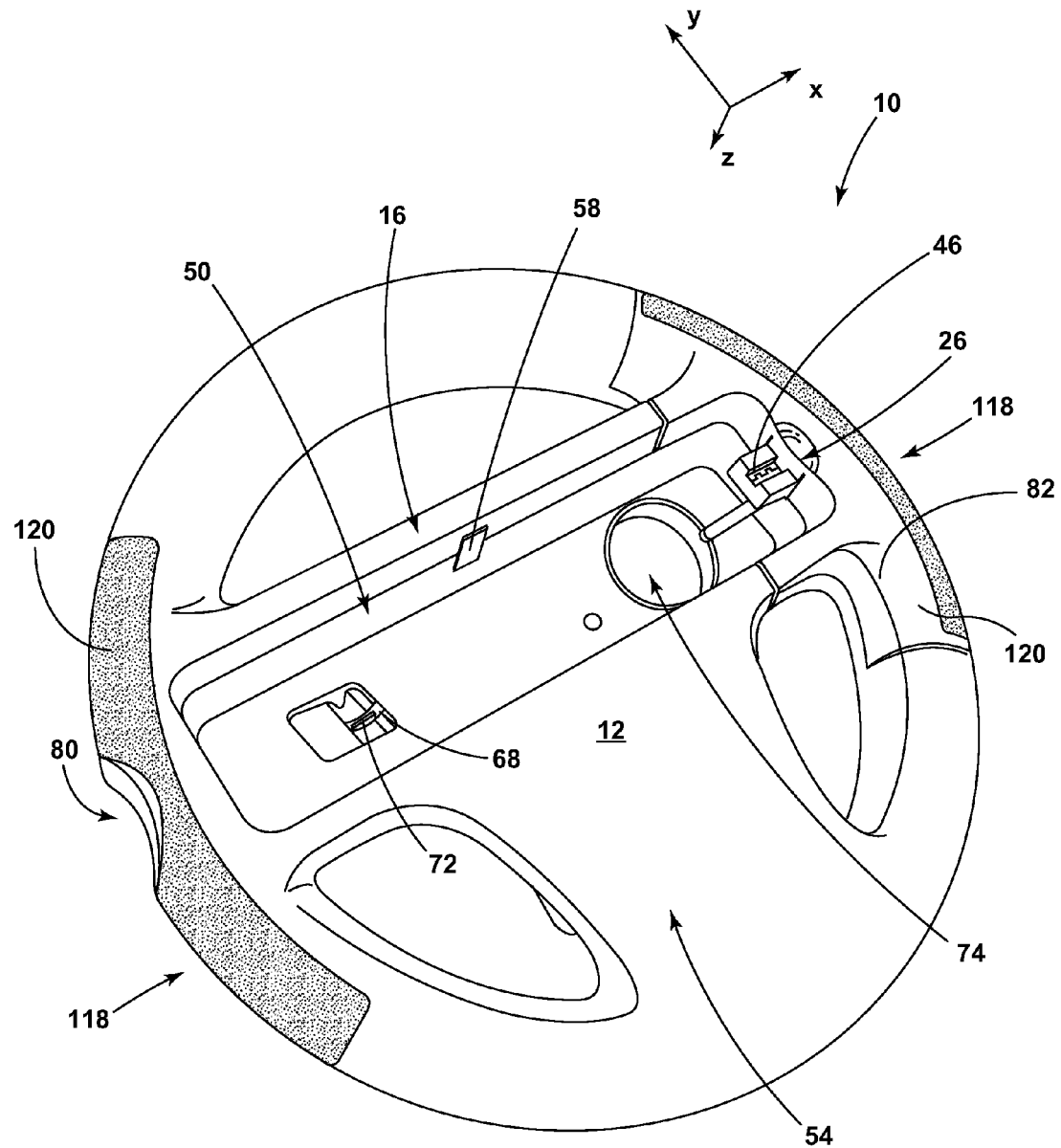
FIG. 1 is a front perspective view of an example video game accessory.
Figure 2:
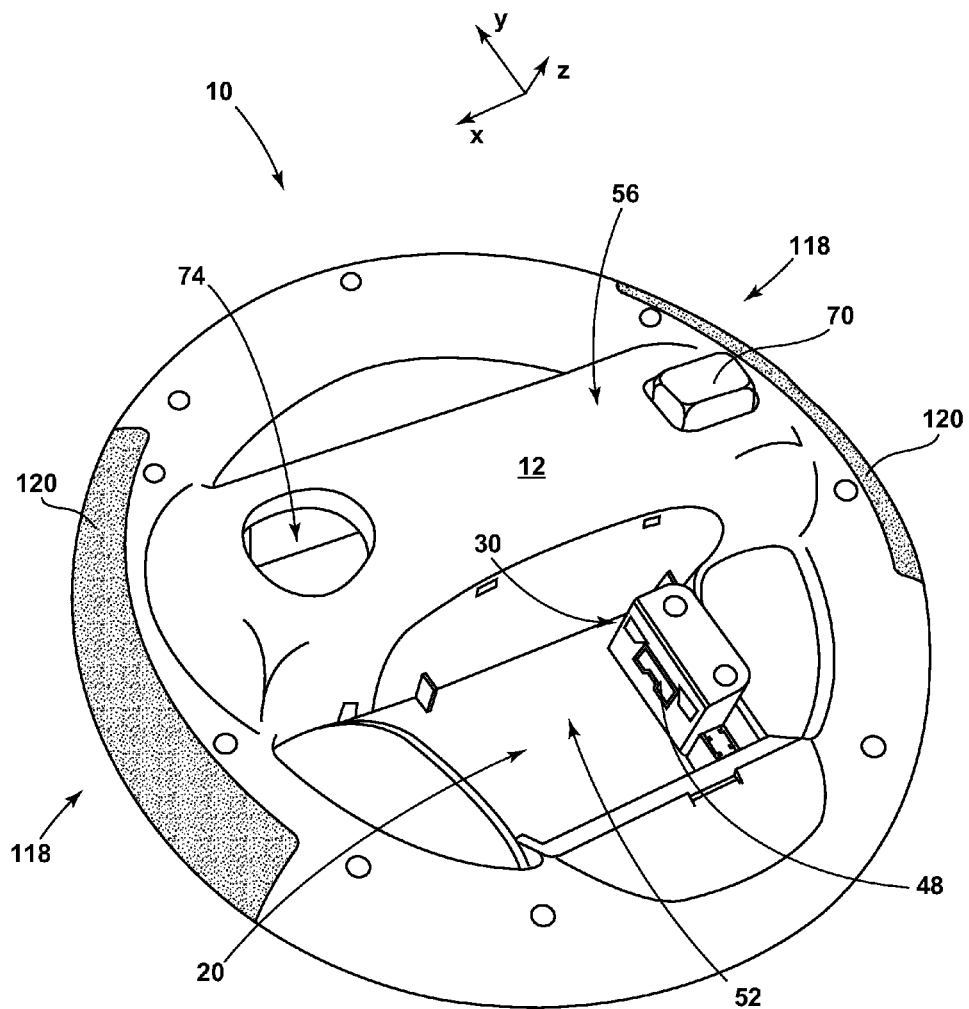
FIG. 2 is a back perspective view of the example video game accessory.

FIGS. 1 and 2 show several views of a video game accessory 10 according to an example of the present invention. In one example, video game accessory 10 comprises a body 12 that is configured to receive a video game controller 14 (shown in FIG. 3, also referred to herein as "controller 14") at a first location 16. Body 12 is also configured to receive a controller expansion device 18 (shown in FIG. 4, also referred to herein as "expansion device 18") at a second location 20 and to maintain the orientation of expansion device 18 so that the orientation of controller expansion device 18 is substantially fixed with respect to the orientation of video game controller 14. Controller expansion device 18 is electrically connectable to video game controller 14. Video game controller 14 at first location 16 is electrically connected to controller expansion device 18 at second location via a pass through cable 22 (FIG. 5) that electrically connects controller 14 to expansion device 18.

Body 12 comprises a shape selected to enhance the realism of game play for the player. In one example, shown in FIGS. 1, 2, 5 and 6, body 12 has the shape of a steering wheel. As such, the remainder of the present disclosure refers to body 12 as steering wheel 12. However, other configurations of body 12 are possible in accordance with the present invention. For example, video game accessory 10 may comprise a body having any of the following example shapes: an airplane controller to simulate a flight stick for flight simulation games; a frying pan, spatula or other cooking utensil for a cooking simulation game; a racquet, Frisbee disc, baseball bat, golf club, fishing rod, or other sports accessory for sports games; a gun or "zapper" for shooting games; a sword or sword hilt for sword fighting games; and guitars or other musical instruments for music games.

Figure 5:
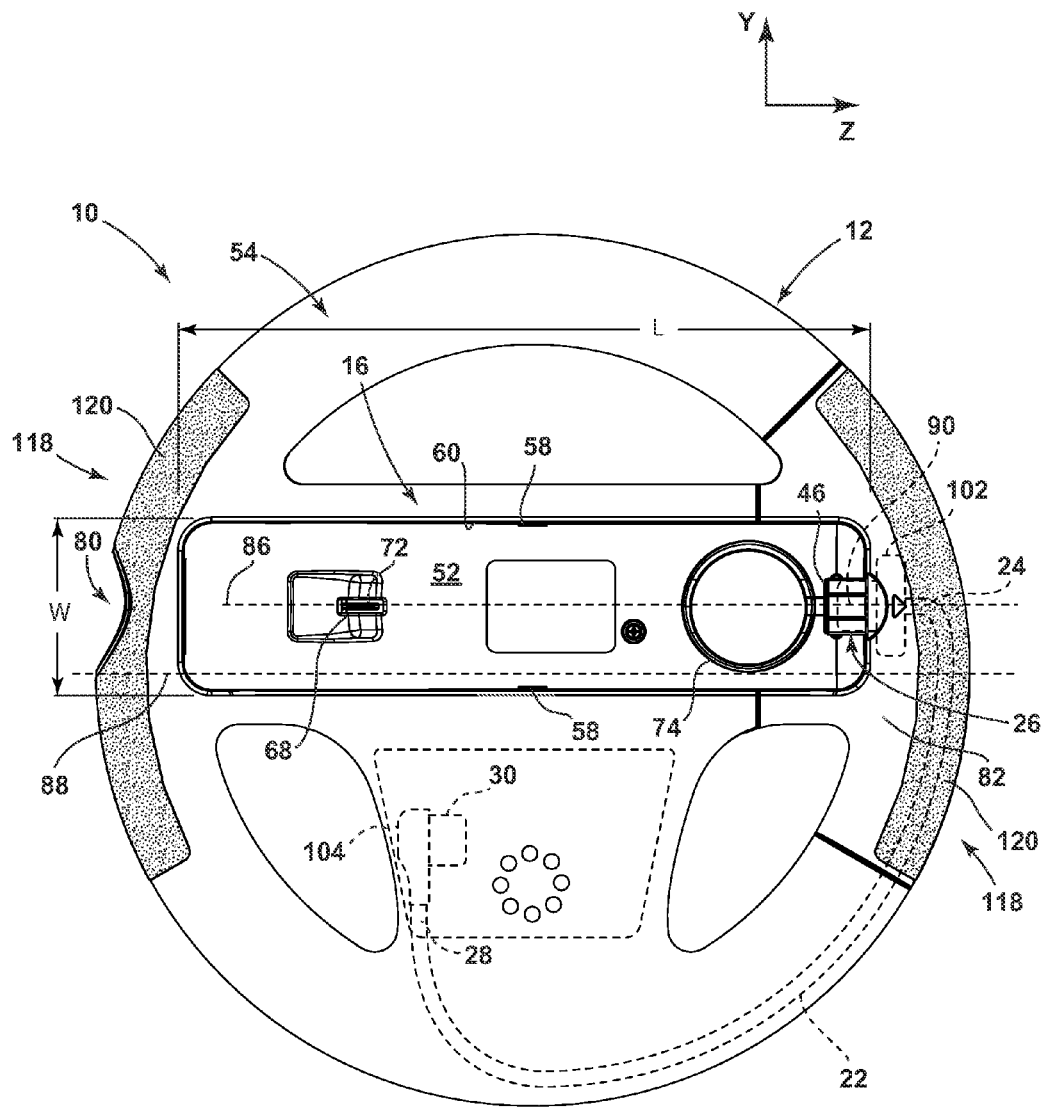
FIG. 5 is a front view of the example video game accessory shown without the video game controller installed.
Figure 6:
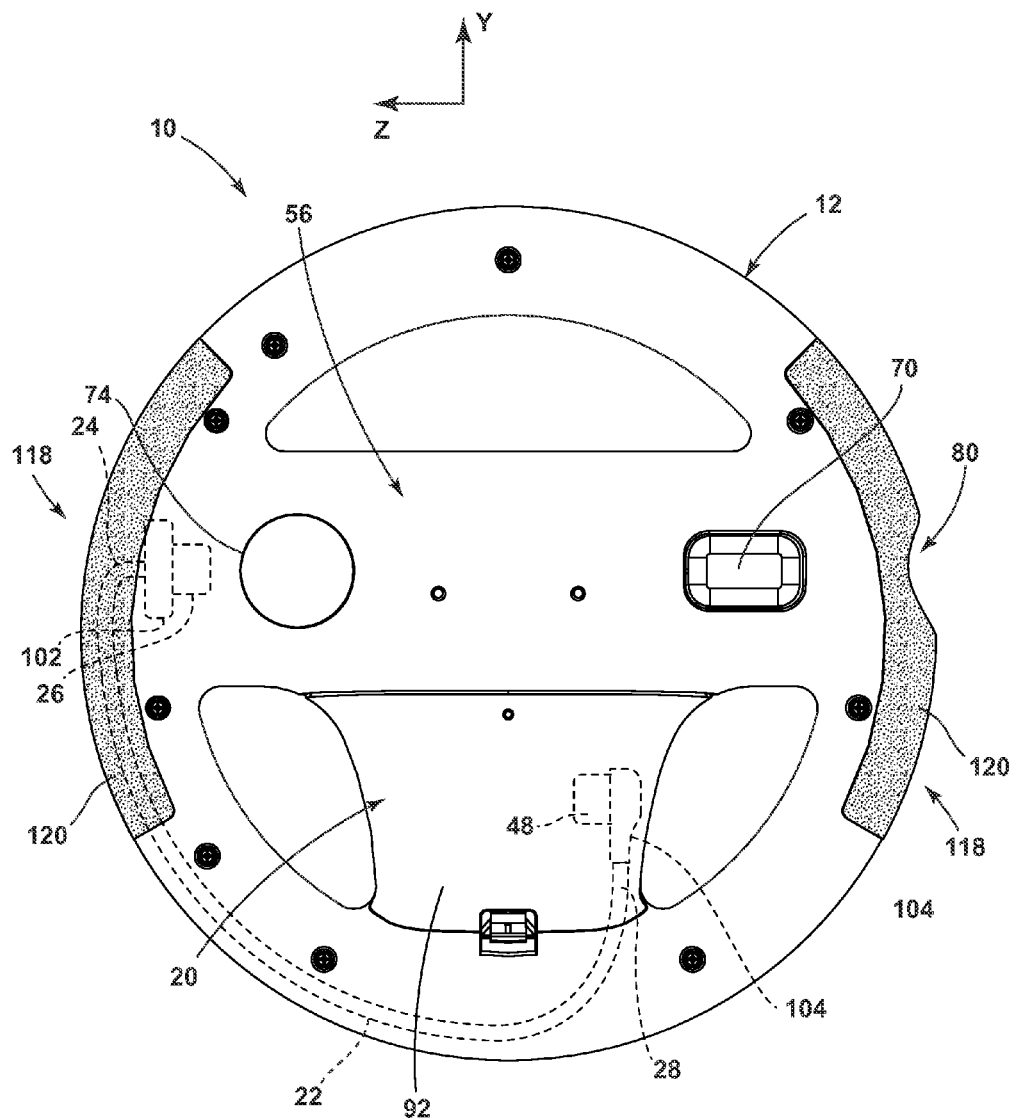
FIG. 6 is a back view of the example video game accessory shown without the controller expansion device installed.

Pass through cable 22 (also referred to herein as "cable 22," shown schematically in FIGS. 5 and 6) provides for an electrical connection between video game controller 14 at first location 16 and controller expansion device 18 at second location 20. Pass through cable 22 comprises a first end 24 that includes a first connector 26 and a second end 28 that includes a second connector 30. First connector 26 engages a mating connector 32 of video game controller 14 (shown in FIG. 7) while second connector 30 engages a mating connector 34 of controller expansion device 18 (shown in FIG. 7). Pass through cable 22 facilitates communication of electrical signals between first connector 26 and second connector 30, and thus provides for electrical communication between video game controller 14 engaged with first connector 26 and controller expansion device 18 engaged with second connector 30. In one example, pass through cable 22 allows for passive electrical pass through of electrical signals between first connector 26 and second connector 30. However, a signal amplifier (not shown) may be included to boost electrical signals passing through cable 22 if it is found that the signals are unacceptably weakened during transmission through cable 22.

In one example, video game controller 14 comprises a controller compatible with the Nintendo Wii video game system, sometimes referred to as a Wii Remote 14, and controller expansion device 18 comprises an expansion device that is compatible with the Wii Remote, such as the Wii MotionPlus expansion device 18. A depiction of a Wii Remote 14 that is installed with body 12 is shown in FIG. 3. A depiction of a Wii MotionPlus expansion device 18 that is installed with body 12 is shown in FIG. 4. In one example, video game controller 14 includes a motion sensor 36 that senses motion (shown schematically in FIG. 7). Motion sensor 36 may comprise an accelerometer, such as a three-axis linear ADXL330 accelerometer manufactured by Analog Devices, Inc. of Norwood, Mass. that is used in the Wii Remote 14. Expansion device 18 may supplement motion sensing of controller motion sensor 36 using one or more motion sensors 38 (shown schematically in FIG. 7), such as a gyroscope sensor, for example, the IDG-600 or IDG-650 multi-axis gyroscope sensor manufactured by InvenSense Inc. of Sunnyvale, Calif. and the X3500W vibration gyroscope sensor manufactured by Epson Toyocom Corp. of Hino, Tokyo, Japan that are used in the Wii MotionPlus device 18.

Figure 7:
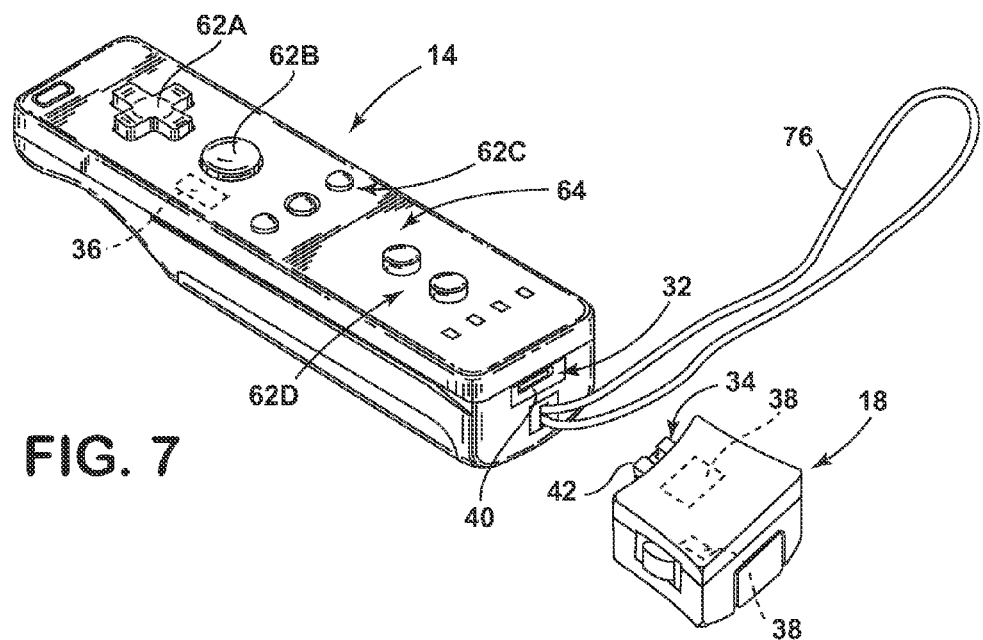
FIG. 7 is a front perspective view of an example video game controller and an example controller expansion device.
Figure 8:
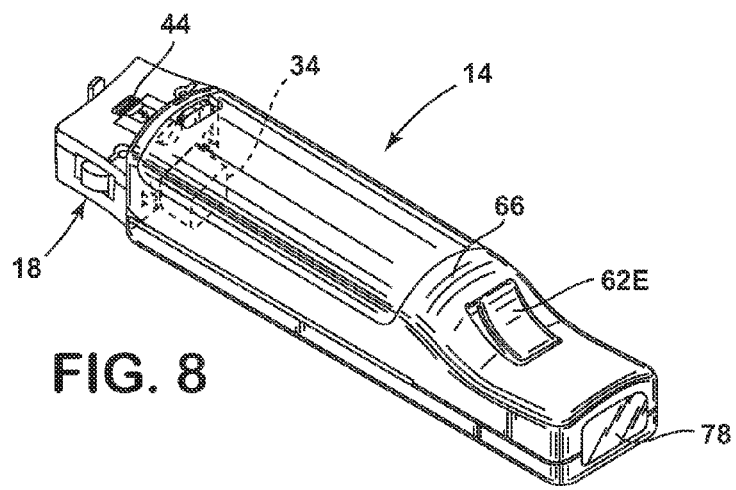
FIG. 8 is a back perspective view showing the example controller expansion device installed with the example video game controller.

The Wii MotionPlus device 18 is designed to electrically connect to the Wii Remote 14 directly, as shown in FIGS. 7 and 8. Wii Remote 14 includes a mating connector 32, also referred to as expansion connector 32, which comprises a female connector port 40 for receiving a complementary mating male connector portion 42, such as connector 34 of Wii MotionPlus device 18. Male connector 34 of Wii MotionPlus device 18 is inserted into female expansion connector 32 of Wii Remote 14 to electrically connect Wii Remote 14 to Wii MotionPlus device 18. Connectors 32 and 34 also allow for the alignment of the orientation of Wii Remote 14 to the orientation of Wii MotionPlus device 18 so that the devices are generally in line with one another. When Wii MotionPlus device 18 is electrically connected to Wii Remote 14, the two devices are calibrated to provide a baseline for the video game system to know the relative position and orientation of Wii Remote 14 and Wii MotionPlus device 18. A locking mechanism 44 ensures that Wii MotionPlus device 18 remains in the same relative position and orientation with respect to Wii Remote 14.

In the example where controller 14 is a Wii Remote and expansion device 18 is a Wii MotionPlus device, first connector 26 on first end 24 of pass through cable 22 has the same configuration as mating connector 34 of Wii MotionPlus device 18, e.g., first connector 26 comprises a male connector portion 46, as shown in FIG. 1, that is insertable into female port 40 of mating connector 32 of Wii Remote 14. Second connector 30 on second end 28 of cable 22 may have the same configuration as mating connector 32 of Wii Remote 14, e.g., second connector 30 may comprise a female connector port 48, shown in FIG. 9, that can receive male connector portion 42 of mating connector 34 of Wii MotionPlus device 18. In this way, first connector 26 simulates the mating connector 34 of expansion device 18 that is engagable with mating connector 32 of video game controller 14, while second connector 30 simulates the mating connector 32 of controller 14 that is engagable with mating connector 34 of controller expansion device 18. Although first connector 26 and second connector 30 are described as a male connector and female connector, respectively, the configurations of first connector 26 and second connector 30 may be switched. The type of connector used at each end 24, 28 of cable 22 will depend on the type of connection needed to video game controller 14 and expansion device 18. The remainder of the present disclosure is described in the context of first connector 26 being a male connector that engages a female mating connector 32 of controller 14 and in the context of second connector 30 being a female connector that engages a male mating connector 34 of expansion device 18. However, modification to the configurations of first connector 26, second connector 30, controller mating connector 32, and expansion device mating connector 34 could be made if a different connector arrangement is desired for a particular application or use.

If a video game accessory is to be used with a controller 14 and an expansion device 18, such as a Wii MotionPlus expansion device with a Wii Remote, it may be desirable to secure the orientation of expansion device 18 with respect to the orientation of controller 14. In the example video game accessory 10 shown in FIGS. 1-6, steering wheel 12 is configured to maintain the orientation of controller expansion device 18 so that the orientation of controller expansion device 18 is substantially fixed with respect to an orientation of video game controller 14. In one example, the relative orientations of video game controller 14 and expansion device 18 are substantially fixed because steering wheel 12 is configured to maintain the orientation of video game controller 14 with respect to the orientation of steering wheel 12 and to maintain the orientation of controller expansion device 18 with respect to the orientation of steering wheel 12 so that the orientation of expansion device 18 is substantially fixed with respect to the orientation of video game controller 14. In one example, steering wheel 12 is configured to secure video game controller 14 in an orientation that is substantially fixed with respect to the orientation of steering wheel 12. Steering wheel 12 may also be configured to secure controller expansion device 18 in an orientation that is substantially fixed with respect to steering wheel 12 so that the orientation of expansion device 18 is substantially fixed with respect to the orientation of video game controller 14.

The use of the phrase "substantially fixed with respect to the orientation," or similar language, in the present disclosure means that the final relative orientations of the two components are substantially fixed before use. However, a substantially fixed orientation is not intended to limit the two components to any particular relative orientation. For example, although the figures generally show video game controller 14 and controller expansion device 18 having a generally parallel orientation, e.g., with the longitudinal axis of each device being oriented generally in the same direction (such as both being oriented to be substantially parallel to the x direction of the orthogonal x-y axes shown in FIGS. 3 and 4), other relative orientations could be used. For example, expansion device 18 could be generally orthogonal to video game controller 14 (e.g., with the longitudinal axis of expansion device 18 oriented generally in the y direction while the longitudinal axis of controller 14 is oriented generally in the x direction) or expansion device 18 could be oriented at an angle with respect to controller 14. In the example of a Wii Remote controller 14 and a Wii MotionPlus expansion device 18, steering wheel 12 is preferably configured so that the orientation of Wii Remote 14 is generally parallel to MotionPlus expansion device 18, more preferably substantially parallel or even exactly parallel, so that MotionPlus expansion device 18 will accurately detect and report roll of steering wheel 12. The orientation of expansion device 18 is "substantially fixed" with respect to the orientation of controller 14 when the selected relative orientation does not substantially change during game play by the player.

Figure 11:
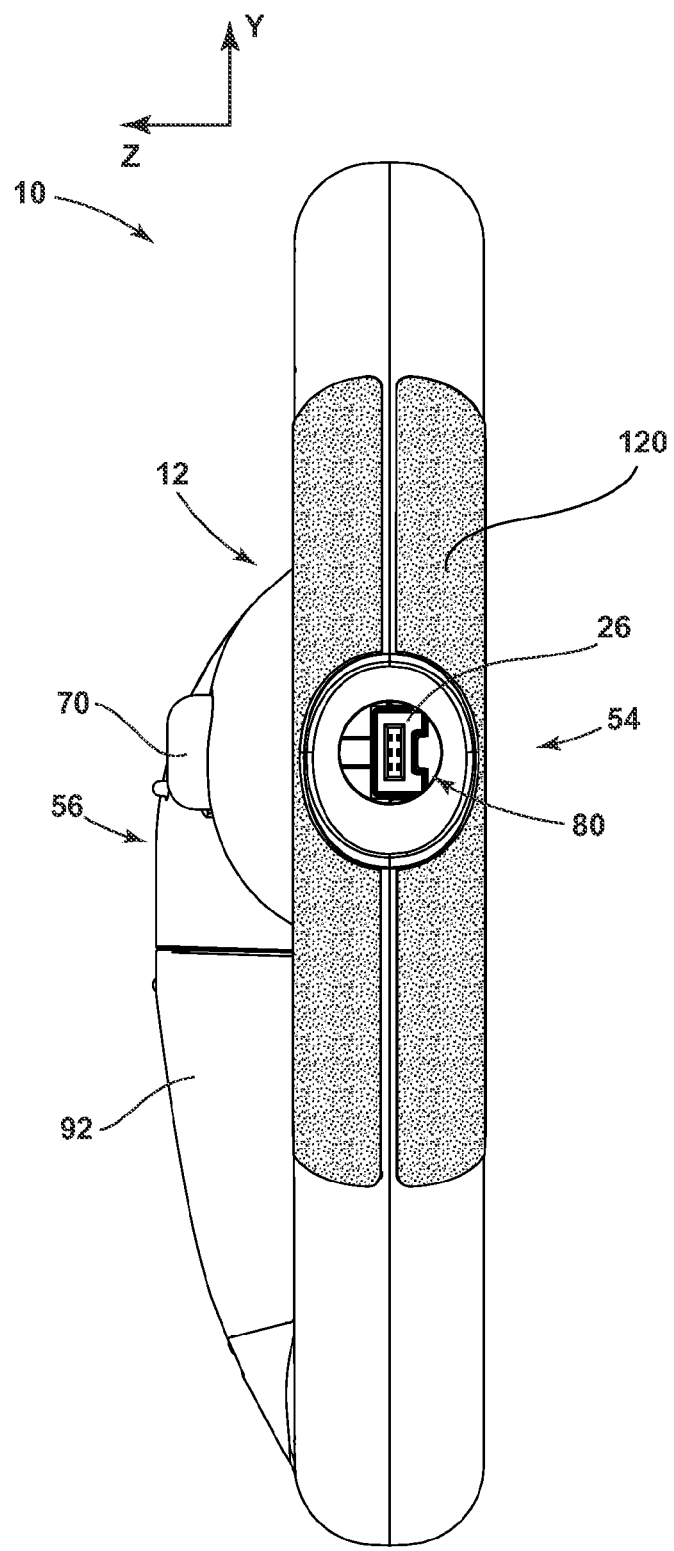
FIG. 11 is a side view of the example video game accessory.

In one example, shown in FIGS. 1 and 2, steering wheel 12 comprises a controller compartment 50 for receiving video game controller 14 and an expansion device compartment 52 for receiving controller expansion device 18. Controller compartment 50 is configured to secure video game controller 14 in an orientation that is substantially fixed with respect to an orientation of steering wheel 12. Similarly, expansion device compartment 52 is configured to secure controller expansion device 18 in an orientation that is substantially fixed with respect to the orientation of steering wheel 12, which in turn causes the orientation of expansion device 18 to be substantially fixed with respect to the orientation of video game controller 14. In one example, steering wheel 12 is configured to generally have a front side 54 and a back side 56 (FIGS. 1, 2, and 11), wherein controller compartment 50 is located at front side 54 and is accessible from front side 54 while expansion device compartment 52 is located at back side 56 and is accessible from back side 56.

In one example, controller compartment 50 has the same general shape as video game controller 14 and is dimensioned to be slightly larger than video game controller 14 so that the orientation of controller 14 is maintained, at least somewhat, by a close fit between controller 14 and controller compartment 50. In one example, wherein video game controller 14 is a Wii Remote, which is about 148 mm (about 5.83 inches) long and about 36.2 mm (about 1.43 inches) wide, controller compartment 50 has a length L (FIG. 5) of about 151 mm (about 5.94 inches) and a width W (FIG. 5) of about 36.5 mm (about 1.44 inches) with a manufacturing tolerance of plus-or-minus about 0.05 mm (about 0.002 inches). As described in more detail below, controller compartment 50 is also configured to place first connector 26 so that it will engage mating connector 32 of controller 14 when video game controller 14 is installed in controller compartment 50.

In one example, steering wheel 12 also comprises one or more compression pads 58 mounted on an inner wall 60 of controller compartment 50, as shown in FIGS. 1 and 5. Compression pads 58 extend inwardly slightly into controller compartment 50 from inner wall 60, such as between about 1 mm and about 3 mm, so that when video game controller 14 is inserted into controller compartment 50, compression pads 58 are deformed by controller 14 to create a compression fit and/or grip between controller 14 and inner wall 60. Compression pads 58 act to further fix the orientation of video game controller 14 with respect to the orientation of steering wheel 12. In one example, the one or more compression pads 58 comprise a resilient material that is temporarily deformed by video game controller 14, but that can return to its original shape upon removal of controller 14 from controller compartment 50. Examples of resilient materials that may be used for compression pads 58 include silicon, natural or synthetic rubbers, for example polyisoprene, Neoprene, or silicone rubber, and other elastomeric polymers.

Video game controller 14 comprises a plurality of gaming controls, such as direction pad 62A, control buttons 62B, 62C, 62D, and trigger 62E (FIGS. 7 and 8) (collectively referred to herein as "gaming controls 62" or "controls 62"). Steering wheel 12 is configured to allow access to all gaming controls 62 that are necessary for the video game for which it is intended to be used, and preferably the body of steering wheel 12 is configured to provide access to all gaming controls 62. In the example of the Wii Remote 14, most gaming controls 62 are provided on a front side 64 of Wii Remote 14 (see FIG. 7) so that access to these controls 62 (e.g., direction pad 62A and control buttons 62B, 62C, 62D) is accomplished by having a generally open front of controller compartment 50 so that gaming controls 62 are not covered, as shown in FIG. 3. Wii Remote 14 also comprises a trigger 62E located on a back side 66 of Wii Remote 14 (shown in FIG. 8). In one example, steering wheel 12 comprises a trigger opening 68 into controller compartment 50 to provide access to trigger 62E, which might otherwise be covered by steering wheel 12. In one example, steering wheel 12 also comprises a trigger button 70 that extends out of back side 56 of steering wheel 12. Trigger button 70 moves between a resting position and an actuated position. A tab 72 is included on trigger button 70 that may be inserted through trigger opening 68 and into controller compartment 50 to actuate trigger 62E when button is moved from the resting position to the actuated position. In one example, trigger button 70 is biased into resting position, such as with a spring between steering wheel 12 and trigger button 70, so that if trigger button 70 is not being pushed by a game player, it will return to the resting position.

Other access openings may be provided into controller compartment 50, such as an opening 74 for a wrist strap 76 of controller 14 (shown in FIG. 7). In one example, video game controller 14 comprises a light port 78, such as an infrared port for sensing infrared light (FIG. 8). Steering wheel 12 may comprise a light pass through opening 80, shown in FIGS. 1 and 11, to allow for the passage of light to or from light port 78.

FIG. 2 shows expansion device compartment 52 without expansion device 18 and FIG. 4 shows expansion device compartment 52 with expansion device 18 installed. In one example, expansion device compartment 52 receives expansion device 18 and is configured to secure controller expansion device 18 in an orientation that is substantially fixed with respect to the orientation of video game controller 14. In one example, expansion device compartment is configured to secure expansion device 18 in an orientation that is substantially fixed with respect to the orientation of steering wheel 12, as described in more detail below.

Figure 12:
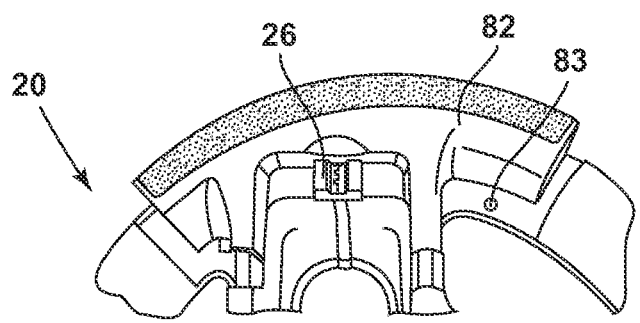
FIG. 12 is a front view of the example video game accessory with an example slider securing mechanism in an open position.
Figure 10:
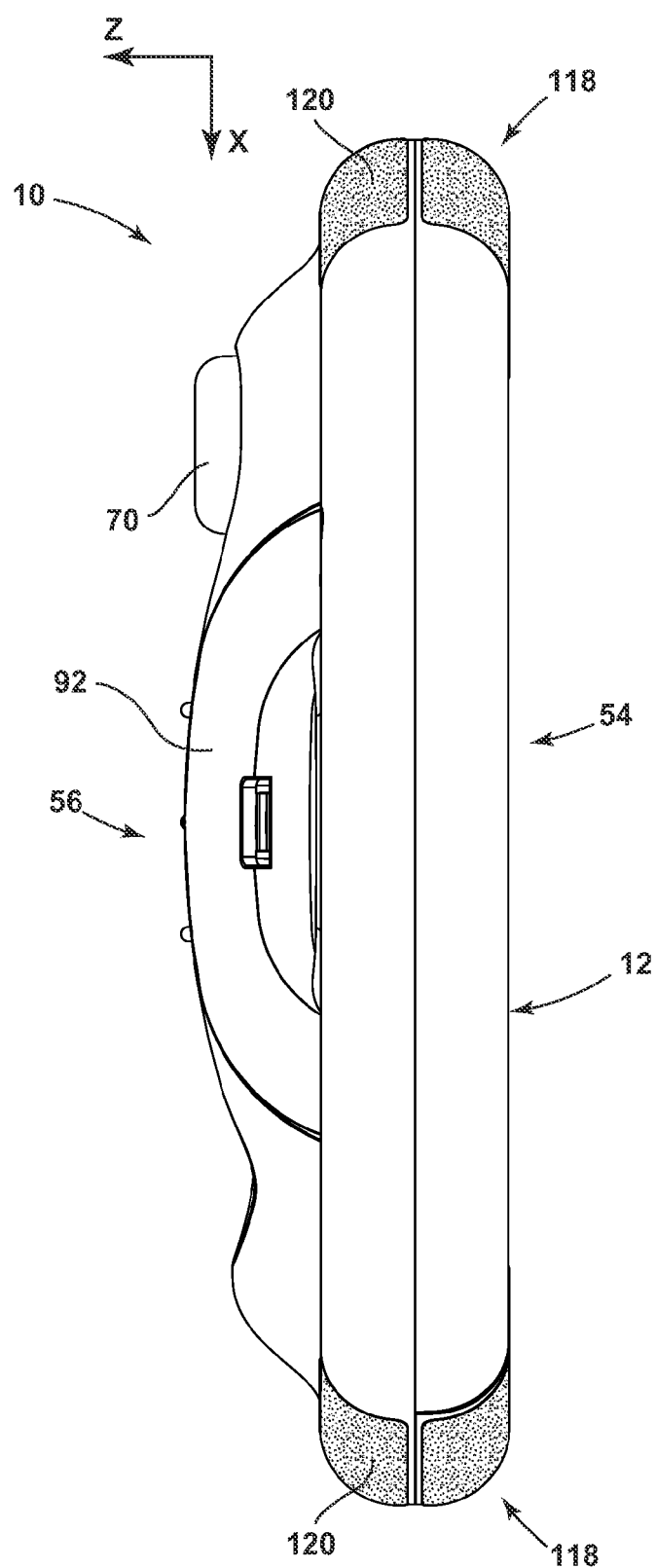
FIG. 10 is a bottom view of the example video game accessory.

FIGS. 1, 5, and 12 show a video game accessory 10 comprising a securing mechanism at controller compartment 50 for securing video game controller 14 in orientation that is substantially fixed with respect to the orientation of steering wheel 12. In one example, the securing mechanism comprises a slider 82 that moves between an open position (FIG. 12) and a closed position (FIG. 5). When slider 82 is in the open position, video game controller 14 may be received by controller compartment 50. When video game controller 14 is placed within controller compartment 50 and slider 82 is moved into the closed position (as in FIG. 3), video game controller 14 is secured within controller compartment 50. Slider 82 may include a detent mechanism, such as a protrusion (not shown) on slider 82 that mates with a detent depression 83 on body 12 (FIG. 12), to hold slider 82 in either the open position or the closed position. Other types of detent mechanisms may be used. For example, a bearing may be used rather than a protrusion. Other configurations of the detent mechanism may also be used. For example, the detent protrusion may be located on body 12 while the detent depression may be located on slider 82.

In one example, best seen in FIGS. 5 and 12, first connector 26 of pass through cable 22 is secured to slider 82 so that first connector 26 extends from slider 82 into controller compartment 50 when slider 82 is in the closed position. As shown in FIG. 5, before video game controller 14 is inserted into controller compartment 50 when slider 82 is in the closed position, first connector 26 extends into controller compartment 50 such that first connector 26 would interfere with the insertion of controller 14 into controller compartment 50. When slider 82 is moved into the open position (FIG. 12), first connector 26 is moved out of the way, leaving enough space for controller 14 to be placed into controller compartment 50. Once controller 14 is placed in controller compartment 50, slider 82 may be slid from the open position to the closed position (FIG. 3). First connector 26 is positioned on slider 82 such that as slider 82 moves toward the closed position, first connector 26 is inserted into mating connector 32 of video game controller 14. When slider 82 is moved into the closed position, first connector 26 is fully engaged with mating connector 32 so that an electrical connection is formed between video game controller 14 and pass through cable 22. In addition, the engagement between first connector 26 secured on slider 82 and mating connector 32 of video game controller 14 acts to further secure video game controller 14 within controller compartment 50 by inhibiting the removal of controller 14 from controller compartment 50.

As shown in FIGS. 3 and 5, in one example, video game controller 14 has a longitudinal axis 84 extending along its length and controller compartment 50 has a longitudinal axis 86 extending along its length. Steering wheel 12 has horizontal dimension 88 extending across its width (e.g., the diameter of steering wheel 12 that is extending generally in the x direction of the orthogonal x-y axes shown in FIG. 5). First connector 26 of pass through cable 22 (secured to slider 82) has a longitudinal axis 90, defined by the direction of insertion of first connector 26 into mating connector 32 of video game controller 14. As shown in FIG. 5, in one example, the longitudinal axis 86 of controller compartment 50 is oriented substantially parallel to the horizontal dimension 88 of steering wheel 12. First connector 26 is oriented so that longitudinal axis 90 of first connector 26 is substantially parallel to the longitudinal axis 86 of controller compartment 50. In one example, the longitudinal axis 90 of first connector 26 is also substantially directly aligned with longitudinal axis 86 of controller compartment 50 so that first connector 26 is substantially centered within controller compartment 50 and so that longitudinal axis 90 of first connector 26 is substantially in line with longitudinal axis 86 of controller compartment 50. The combination of longitudinal axis 86 of controller compartment 50 being substantially parallel to the horizontal dimension 88 of steering wheel 12 and the longitudinal axis 90 of first connector 26 being substantially parallel to controller compartment 50 act together so that when video game controller 14 is installed, longitudinal axis 84 of video game controller 14 is substantially parallel to the horizontal dimension 88 of steering wheel 12.

Figure 9:
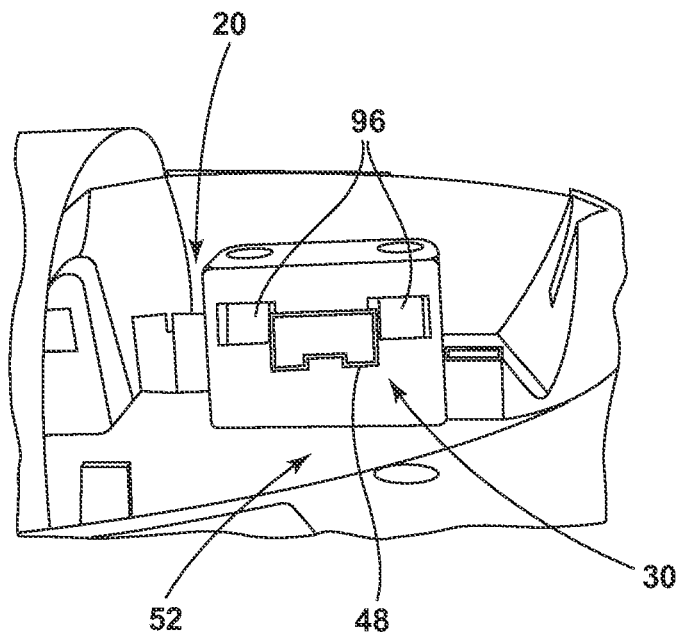
FIG. 9 is a close view of an example connector secured at the example expansion device compartment.

In one example, best shown in FIGS. 2, 4, and 9, steering wheel 12 comprises a second securing mechanism at expansion device compartment 52 for maintaining the orientation of controller expansion device 18 with respect to the orientation of steering wheel 12. The securing mechanism secures expansion device 18 in an orientation that is substantially fixed with respect to the orientation of video game controller 14. In one example, the securing mechanism comprises second connector 30 of pass through cable 22 mated with mating connector 34 of controller expansion device 18, wherein the mating between second connector 30 and mating connector 34 provides for the orientation of controller expansion device 18. In one example, steering wheel 12 also comprises a cover 92 (FIGS. 2 and 6) to cover at least a portion of expansion device compartment 52. Cover 92 may also include a compression pad (not shown), such as resilient foam or silicon pad, on an interior portion of cover 92 that is compressed between cover 92 and expansion device 18 to further secure expansion device 18 in place. In one example, wherein expansion device 18 comprises a locking mechanism 44 (such as with a Wii MotionPlus device 18), steering wheel 12 may also comprise one or more openings or pits 96 (FIG. 9) proximate second connector 30 that are engaged by locking mechanism 44.

As noted above, steering wheel 12 is configured to maintain the orientation of controller expansion device 18 to be substantially fixed with respect to an orientation of video game controller 14. Steering wheel 12 may be configured to substantially align expansion device 18 with respect to controller 14 along at least one axis of steering wheel 12 (such as the x direction of the orthogonal x-y-z axes shown in FIGS. 1, 2, 10, and 11). In one example, steering wheel 12 may be configured to substantially align expansion device 18 with respect to controller 14 along two axes of steering wheel 12, but not along a third axis (such as aligning along the x and y directions, but not along the z direction of the orthogonal x-y-z axes shown in FIGS. 1, 2, 10, and 11), wherein the non-alignment along the third axis may arise, for example, from the general placement of controller 14 and expansion device 18 on a front side 54 and a back side 56, respectively, of steering wheel 12.

As shown in FIG. 4, in one example, second connector 30 of pass through cable 22 has a longitudinal axis 98, defined by the direction of insertion of mating connector 34 of expansion device 18 into second connector 30. In one example, the longitudinal axis 98 of second connector 30 is substantially parallel to the horizontal direction 88 of steering wheel 12 when controller expansion device 18 is installed in expansion device compartment 52 and mating connector 34 of expansion device 18 is engaged with second connector 30 of pass through cable 22. In the example shown in FIGS. 3 and 4, because video game controller 14 is substantially parallel to the horizontal dimension 88 of steering wheel 12 when video game controller 14 is installed and because expansion device 18 is substantially parallel to the horizontal dimension 88 when expansion device 18 is installed, expansion device 18 and video game controller 14 are also substantially parallel to each other. The substantially parallel relative orientation provided by the example steering wheel 12 of FIGS. 3 and 4 may allow video game accessory 10 to mimic the designed arrangement of video game controller 14 and controller expansion device 18, which may have been designed to be connected directly in line with one another, such as with the Wii Remote 14 and Wii MotionPlus device 18 described above with respect to FIGS. 7 and 8.

Figure 13:
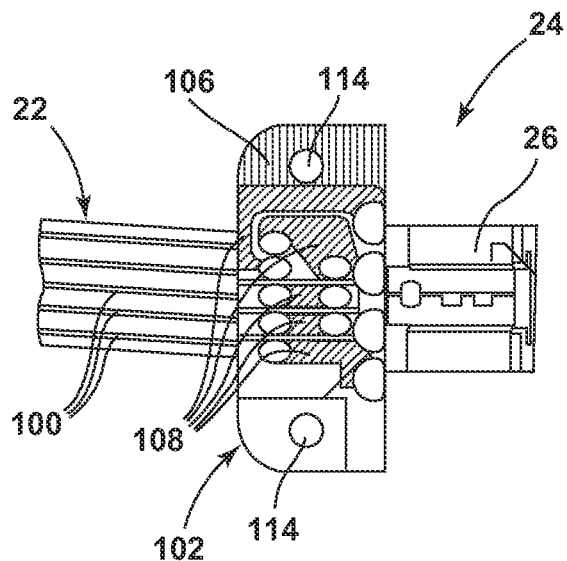
FIG. 13 is a view of an example wiring board at a first end of an example pass through cable.
Figure 14:
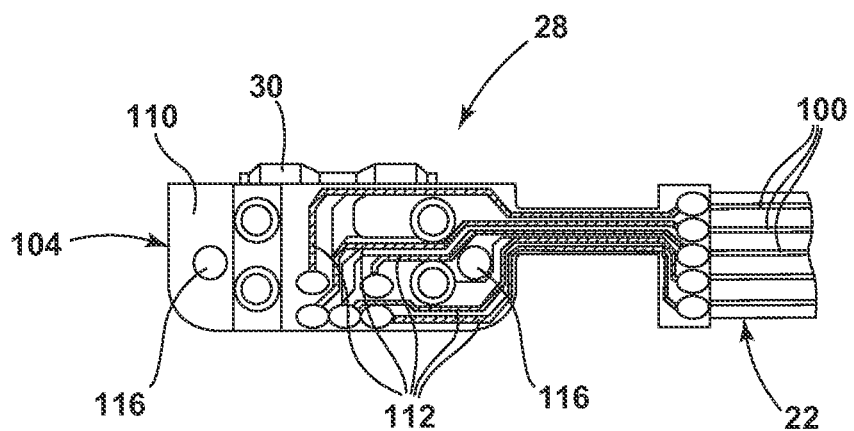
FIG. 14 is a view of an example wiring board at a second end of the example pass through cable.

FIGS. 13 and 14 show an example first end 24 and an example second end 28, respectively, of an example pass through cable 22 that comprises a ribbon cable 22 comprising a plurality of wires 100 that extends between first end 24 and second end 28. Wires 100 are electrically connected to first connector 26 on first end 24 and second connector 30 on second end 28. In one example, cable 22 comprises a first wiring board 102 at first end 24 to provide connection pathways between wires 100 and first connector 26 and a second wiring board 104 at second end 28 to provide connection pathways between wires 100 and second connector 30. In one example, first wiring board 102 comprises a substrate 106 comprising a non-conductive material, such as a dielectric, and conduction pathways 108, such as copper traces, deposited on substrate 106. Similarly, in one example, second wiring board 104 comprises a substrate 110 comprising a non-conductive material, such as a dielectric, and conduction pathways 112, such as copper traces, deposited on substrate 110. Conduction pathways 108, 112 provide an electrical pathway for electrical signals to travel between first connector 26 and wires 100 and between second connector 30 and wires 100 in order to carry the electrical signals between video game controller 14 and controller expansion device 18. In one example, conduction pathways 108, 112 on wiring boards 102, 104 simply provide a passive pass through of electrical signals between first connector 26 and wires 100 and between second connector 30 and wires 100.

Wiring boards 102, 104 may also provide structures to easily mount connectors 26, to steering wheel 12. For example, first wiring board 102 may provide a mounting location to mount first connector 26 to slider 82 in order to provide for secure placement and orientation of first connector 26 within controller compartment 50 to ensure proper engagement between first connector 26 and mating connector 32 of video game controller 14. Similarly, second wiring board 104 may provide for secure placement and orientation of second connector 30 within expansion device compartment 52 to ensure proper engagement between second connector 30 and mating connector 34 of controller expansion device 18. In one example, wiring boards 102 and 104 are mounted directly to steering wheel 12, such as with fasteners inserted through mounting holes 114, 116.

In one example, body 12 comprises a material that provides mechanical support for pass through cable 22, including connectors 26 and 30, and for controller 14 and expansion device 18 when installed. In one embodiment, body 12 comprises a polymeric material. In one embodiment, body 12 comprises a heavy duty plastic so that video game accessory 10 will feel solid and durable to a player when it is used. In one example, body 12 comprises ABS 121 plastic molded into the desired shape of body 12.

As shown in FIGS. 1, 2, 5, and 6, for some example video game accessories 10, body 12 may comprise a handle 118 at the locations on body 12 where a player holds accessory 10. In one example, accessory 10 may further comprise a grip 120 at each handle 118. In one example, grip 120 comprises a rubberized material to facilitate the players gripping of handle 118, such as PCB G10 rubberized plastic.

As described above, body 12 of the video game accessory 10 allows video game controller 14 to be located at a first location 16 of body 12 and the controller expansion device 18 to be located at a second location 20 of body 12 that is remote from first location 16. Thus, certain physical aspects of the video game accessory 10 may be modified based on the location and orientation of video game controller 14 and controller expansion device 18. For example, since video game controller 14 and expansion device 18 may have different sizes, dimensions, and weights, it is possible to modify the weight distribution and balance of video game accessory 10 when controller 14 and expansion device 18 are installed in order to modify the sensation experienced by the game player.

In the examples described above for a steering wheel 12, it may be desirable, for example, for steering wheel 12 to feel as balanced as possible for the player. Therefore, in one example, steering wheel 12 is configured so that both first location 16 of video game controller 14 and second location 20 of controller expansion device 18 are as close as possible to the center of steering wheel 12. However, for other types of games, it may be desirable for the body of video game accessory 10 to feel slightly imbalanced. For example, in a tennis game, it may be desirable for a racquet-shaped body to have a slight imbalance at the "strings" to simulate the increased force that is experienced due to a tennis ball strike. In such a case, the imbalance may be achieved by positioning second location 20 of the expansion device 18 off-center without a counter-balance. In the tennis racquet example, the second location of expansion device 18 could be located at the "strings" of the racquet to achieve the desired imbalance. Other positioning of first location 16 and second location 20 may be desirable depending on the shape of body 12 and the desired affect on the gaming for the player.

This disclosure refers to illustrative examples that are not meant to be construed in a limiting sense. Various modifications of the illustrative examples, as well as additional examples in line with the disclosure, will be apparent to persons skilled in the art upon reference to this description. Any specific numerical value or range described in the foregoing disclosure shall not be limiting, except for values or ranges included in the following claims.

The invention claimed is:

1. A video game accessory comprising:
a body configured to:
receive a video game controller at a first compartment at a first location of the body when a slider of the body is in an open position, wherein the slider is movable from the open position to a closed position, wherein the video game controller is receivable in the first compartment when the slider is in the open position, and wherein the video game controller is held within the first compartment when the slider is in the closed position;
receive a controller expansion device connectable to the video game controller at a second compartment at a second location of the body; and
maintain an orientation of the controller expansion device so that the orientation of the controller expansion device is substantially fixed with respect to an orientation of the video game controller; and
a pass through cable comprising a first end that includes a first connector and a second end that includes a second connector, the pass through cable extending from the first location to the second location, wherein the first connector is engageable with a first mating connector of the video game controller and the second connector is engageable with a second mating connector of the controller expansion device, and wherein the first connector is secured to the slider so that the first connector is engageable with the video game controller when the slider is in the closed position.

2. The video game accessory of claim 1, wherein the first compartment is configured to secure the video game controller in an orientation that is substantially fixed with respect to the orientation of the body and the second compartment is configured to secure the controller expansion device in an orientation that is substantially fixed with respect to the orientation of the body so that the orientation of the controller expansion device is substantially fixed with respect to the orientation of the video game controller.

3. The video game accessory of claim 1, wherein the body comprises a shape selected from the group consisting of a steering wheel, a sports accessory, a gun, a zapper, a sword, a sword hilt, and a musical instrument.

4. The video game accessory of claim 1, wherein the video game controller comprises a motion sensor.

5. The video game accessory of claim 1, wherein the controller expansion device comprises a motion sensor.

6. The video game accessory of claim 1, wherein the body defines a steering wheel further comprising a securing mechanism at the first location configured to secure the video game controller in an orientation that is substantially fixed with respect to the orientation of the steering wheel.

7. The video game accessory of claim 1, wherein the pass through cable further comprises a wiring board at the first end secured to the slider proximate the first compartment, wherein the first connector is secured to the wiring board and wherein the wiring board electrically connects the first connector to the pass through cable.

8. The video game accessory of claim 1, further comprising at least one pad mounted on an interior wall of the first compartment to provide a friction grip with the video game controller within the first compartment.

9. The video game accessory of claim 1, further comprising a cover for covering at least a portion of the second compartment.

10. The video game accessory of claim 1:
wherein the first compartment defines a longitudinal axis;
wherein the longitudinal axis is oriented substantially parallel to a horizontal dimension of the body and wherein the first connector is oriented substantially parallel to the longitudinal axis of the first compartment such that the video game controller is substantially parallel to the horizontal dimension of the body when the video game controller is installed in the first compartment and the first mating connector of the video game controller is engaged with the first connector; and
wherein the second connector is oriented substantially parallel to the longitudinal axis of the first compartment so that the controller expansion device is substantially parallel to the horizontal dimension of the body when the controller expansion device is installed in the second compartment and the second mating connector of the controller expansion device is engaged with the second connector.

11. The video game accessory of claim 1, wherein the pass through cable extends between the first location and the second location through an interior portion of the body.

12. The video game accessory of claim 1, further comprising a handle portion and a grip comprising a rubberized material disposed on the handle portion.

13. The video game accessory of claim 1, wherein the body further comprises at least one opening into the first compartment, wherein the opening is configured for at least one of accessing one or more controls of the video game controller or exposing a light port of the video game controller.

14. A video game accessory comprising:
a steering wheel comprising a first compartment at a first location proportioned to receive a video game controller and a second compartment at a second location proportioned to receive a controller expansion device connectable to the video game controller;

a slider at the first compartment, wherein the slider is movable from an open position to a closed position, wherein the video game controller is receivable in the first compartment when the slider is in the open position; and a pass through cable comprising a first end that includes a first connector and a second end that includes a second connector, the pass through cable extending from the first compartment to the second compartment through an interior portion of the steering wheel, wherein the first connector is secured to the slider so that the first connector is engageable with the video game controller when the slider is in the closed position, and wherein the second connector is secured to the steering wheel at the second location;

wherein the first compartment is configured to secure the video game controller in an orientation that is substantially fixed with respect to the orientation of the steering wheel and wherein the second compartment is configured to secure the controller expansion device in an orientation that is substantially fixed with respect to the orientation of the steering wheel so that the orientation of the controller expansion device is substantially fixed with respect to the orientation of the video game controller.

15. The video game accessory of claim 14, wherein the video game controller is held within the first compartment when the slider is in the closed position.

16. A video game accessory comprising:

a steering wheel comprising a first compartment at a first location that receives a video game controller and a second compartment at a second location that receives a controller expansion device connectable to the video game controller;

a slider at the first compartment, wherein the slider is movable from an open position to a closed position, wherein the video game controller is receivable in the first compartment when the slider is in the open position and wherein the video game controller is held within the first compartment such that the orientation of the video game controller is substantially fixed with respect to the orientation of the steering wheel;

a pass through cable comprising a first end that includes a first connector and a second end that includes a second connector, the pass through cable extending from the first compartment to the second compartment through an interior portion of the steering wheel, wherein the first connector is secured to the slider so that the first connector is engageable with the video game controller when the slider is in the closed position, and wherein the second connector is secured to the body at the second location;

wherein the first connector is engageable with a first mating connector of the video game controller and the second connector is engageable with a second mating connector of the controller expansion device; and a cover for covering at least a portion of the second compartment, wherein the controller expansion device has an orientation that is substantially fixed with respect to the orientation of the steering wheel so that the orientation of the controller expansion device is substantially fixed with respect to the orientation of the video game controller when the second mating connector of the controller expansion device is mated with the second connector and when the cover covers the portion of the second compartment.

17. A video game accessory comprising:

a body configured to:

receive a video game controller at a first location of the body;

receive a controller expansion device connectable to the video game controller at a second location of the body; and maintain an orientation of the controller expansion device so that the orientation of the controller expansion device is substantially fixed with respect to an orientation of the video game controller;

a securing mechanism at the second location configured to maintain the orientation of the controller expansion device with respect to the orientation of the body so that the orientation of the controller expansion device is substantially fixed with respect to the orientation of the video game controller; and a pass through cable comprising a first end that includes a first connector and a second end that includes a second connector, the pass through cable extending from the first location to the second location, wherein the first connector is engageable with a first mating connector of the video game controller and the second connector is engageable with a second mating connector of the controller expansion device, wherein the second connector of the pass through cable is secured to the body at the second location, and wherein the securing mechanism comprises the second connector of the pass through cable mated with the second mating connector of the controller expansion device.

18. The video game accessory of claim 17, wherein the pass through cable further comprises a wiring board at the second end secured to the body proximate the second location, wherein the second connector is secured to the wiring board and wherein the wiring board electrically connects the second connector to the pass through cable.

* * * * *